United States Patent
Jadhav et al.

(10) Patent No.: US 9,885,600 B2
(45) Date of Patent: Feb. 6, 2018

(54) METHOD AND DEVICE FOR DIAGNOSING AN AUXILIARY HEATING FUNCTION OF AN AIR MASS SENSOR

(71) Applicant: Robert Bosch GmbH, Stuttgart (DE)

(72) Inventors: Pandurang Jadhav, Bangalore (IN); Daniel Kuhn, Walddorfhaeslach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 34 days.

(21) Appl. No.: 14/969,285

(22) Filed: Dec. 15, 2015

(65) Prior Publication Data

US 2016/0169731 A1 Jun. 16, 2016

(30) Foreign Application Priority Data

Dec. 16, 2014 (DE) .................. 10 2014 226 079

(51) Int. Cl.
| | |
|---|---|
| *G01F 25/00* | (2006.01) |
| *B60K 35/00* | (2006.01) |
| *G01F 1/698* | (2006.01) |
| *F02D 41/18* | (2006.01) |

(Continued)

(52) U.S. Cl.
CPC .......... *G01F 25/0053* (2013.01); *B60K 35/00* (2013.01); *F02D 41/1495* (2013.01); *F02D 41/187* (2013.01); *F02D 41/222* (2013.01); *G01F 1/698* (2013.01); *G01F 1/6983* (2013.01); *G01F 25/0007* (2013.01); *F02D 41/1494* (2013.01); *Y02T 10/40* (2013.01)

(58) Field of Classification Search
CPC .. G01F 25/0007; G01F 1/8436; G01F 1/8477; G01F 25/003; G01F 15/024
USPC .......................................................... 73/1.16
See application file for complete search history.

(56) References Cited

U.S. PATENT DOCUMENTS

| | | | | |
|---|---|---|---|---|
| 5,379,627 A | * | 1/1995 | Bates, Jr. ............ | G01F 25/0007 73/1.16 |
| 9,612,166 B2 | * | 4/2017 | Kappelmann ........ | G01K 15/005 |

(Continued)

FOREIGN PATENT DOCUMENTS

DE 101 11 840 10/2002

*Primary Examiner* — Eric S McCall
*Assistant Examiner* — Mohammed E Keramet-Amircola
(74) *Attorney, Agent, or Firm* — Norton Rose Fulbright US LLP; Gerard Messina

(57) ABSTRACT

For diagnosing a proper functioning of an auxiliary heater in an air mass sensor in an engine system including an internal combustion engine, the auxiliary heater being used for preventing contamination of a sensor area, the air mass sensor communicating air mass information via a signal line during a sensor operating mode and, if a specified state on the signal line is detected, activating the auxiliary heater, the following are performed: setting the state of the signal line to the specified state for a predefined time period in an auxiliary heater operating mode; transmitting a first temperature information before the activation of the auxiliary heater operating mode and a second temperature information via the signal line after expiration of the predefined time period; and detecting the proper functioning of the auxiliary heater depending on the difference between the first temperature information and the second temperature information.

10 Claims, 3 Drawing Sheets

(51) Int. Cl.
*F02D 41/22* (2006.01)
*F02D 41/14* (2006.01)

(56) References Cited

U.S. PATENT DOCUMENTS

| | | | |
|---|---|---|---|
| 2006/0130469 A1* | 6/2006 | Baeuerle | B60H 1/025 60/300 |
| 2007/0125077 A1* | 6/2007 | Wegst | F01N 3/0807 60/299 |
| 2011/0146633 A1* | 6/2011 | Moessner | F02B 43/10 123/556 |

* cited by examiner

METHOD AND DEVICE FOR DIAGNOSING AN AUXILIARY HEATING FUNCTION OF AN AIR MASS SENSOR

BACKGROUND OF THE INVENTION

1. Field of the Invention

The present invention relates to air mass sensors, in particular hot-film air-mass sensors, which include an auxiliary heater for preventing contamination of a sensor area. The present invention also relates to measures for checking the proper functioning of the auxiliary heater of an air mass sensor.

2. Description of the Related Art

An air mass sensor is used in an engine system of a motor vehicle to measure a mass flow rate of fresh air drawn in by an internal combustion engine. In air-guided internal combustion engines, the ascertained air mass flow rate is provided as an input variable for a calculation of a fuel quantity to be injected.

An air mass sensor designed as a hot-film air-mass sensor (HFM sensor) includes a heated sensor area, which is situated in an air flow. Cooling effectuated by the air flow is compensated for by provided heat output, so that the sensor area is held at a constant temperature. The heat output required for this depends on the air mass flow rate of the air flow. As an alternative, cooling effectuated by the air flow may be ascertained via the sensor diaphragm and a corresponding temperature difference may be provided as information about the air mass flow rate.

An auxiliary heater may be provided in the air mass sensor in order to keep the sensor area free from contamination. Such an air mass sensor including a heatable sensor area is described in the published German patent document DE 101 11 840 C2. An auxiliary heater is provided, which may be operated in such a way that thermogradient eddies are formed in the area of the auxiliary heater, which result in precipitates of contamination in the air flow in the area of the auxiliary heater outside of the sensor area. The contamination may result, for example, from the ambient air or from oil vapors introduced into the air supply system from a crankcase when the engine is shut off.

Failure of the auxiliary heater results in a slow contamination of the sensor area, which may result in a progressive degradation of the measurement and ultimately in unusable measured values.

BRIEF SUMMARY OF THE INVENTION

According to a first aspect, a method for diagnosing the proper functioning of an auxiliary heater in an air mass sensor in an engine system including an internal combustion engine is provided, the auxiliary heater being used for preventing contamination of a sensor area. The air mass sensor is designed for communicating a piece of air mass information via a signal line during a sensor operating mode and, if a specified state on the signal line is detected, to activate the auxiliary heater, including the following steps:
  setting the state of the signal line to the specified state for a predefined time period in an auxiliary heater operating mode;
  gathering and transmitting a first piece of temperature information before the activation of the auxiliary heater operating mode and a second piece of temperature information via the signal line after expiration of the predefined time period;
  detecting the proper functioning of the auxiliary heater depending on the difference between the first piece of temperature information and the second piece of temperature information.

The auxiliary heater in the air mass sensor is generally activated by a signal level on the signal line specified by the control unit. For this purpose, the electrical potential of the signal line may be drawn by the control unit to the specified potential, such as, e.g., ground potential.

Conventional diagnostic methods may check whether the auxiliary heater in the air mass sensor is actually activated only on the part of the control unit, on the basis of the presence of the specified potential on the signal line. It cannot be determined whether the auxiliary heater in the air mass sensor is actually activated depending on the signal level on the signal line.

The aforementioned method makes it possible, on the other hand, to detect the proper functioning of the auxiliary heater with the aid of the control unit. In this way, a failure of the auxiliary heater may be detected early and the air mass sensor may be replaced during regular maintenance before contamination of the sensor area adversely affects the measured values or renders them unusable. A failure of the air mass sensor due to a defect of the auxiliary heater which would necessitate an unscheduled repair may therefore be prevented.

According to the aforementioned method for diagnosing the auxiliary heater, an internal sensor temperature of the air mass sensor is determined before and after a predefined time period, i.e., a test time period, during which the auxiliary heater is activated. If the auxiliary heater is functioning, it may be expected that the internal temperature of the air mass sensor has increased. If a significant temperature increase is detected, it may be concluded that the auxiliary heater is functioning. Otherwise, it may be concluded that the auxiliary heater is not functional.

In addition, the specified state may correspond to a specified potential on the signal line.

It may be provided that the specified potential on the signal line is detected when a signal applied by the air mass sensor onto the signal line does not change the specified potential.

According to one specific embodiment, the auxiliary heater operating mode may be activated after the engine system is shut off.

It may be provided that the proper functioning of the auxiliary heater is detected when the difference between the first piece of temperature information and the second piece of temperature information exceeds a predefined threshold value.

In addition, a defect of the auxiliary heater may be detected when the particular difference between the first piece of temperature information and the second piece of temperature information gathered after a shutoff of the engine system falls below the predefined threshold value one time or multiple times.

After expiration of the predefined time period, the sensor operating mode may be activated, at least for a short time. Information may be transmitted via the signal line during the sensor operating mode in that no specified state is set on the signal line.

According to a further aspect, a control unit for diagnosing the proper functioning of an auxiliary heater for preventing contamination of a sensor area is provided in an air mass sensor in an engine system including an internal combustion engine. The air mass sensor is designed for communicating a piece of air mass information via a signal line and, if a specified state on the signal line is detected, to activate the auxiliary heater, including:

an input stage, which is designed for providing an input impedance and to set a specified state on the signal line, a control unit logic, which is designed to control the input stage in such a way that the state of the signal line is set to the specified state in an auxiliary heater operating mode for a predefined time period;

receive a first piece of temperature information before the activation of the auxiliary heater operating mode and a second piece of temperature information after expiration of the predefined time period;

detect the proper functioning of the auxiliary heater depending on the difference between the first piece of temperature information and the second piece of temperature information.

In addition, the control unit logic may be designed to control the input stage after a signaling of a shutoff of the engine system, so that the potential of the signal line is set to the specified potential for the predefined time period in the auxiliary heater operating mode.

According to a further aspect, an engine system including an internal combustion engine and an air mass sensor, which is designed to send air mass information via a signal line to the aforementioned control unit, are provided.

DETAILED DESCRIPTION OF THE INVENTION

Figure 1:
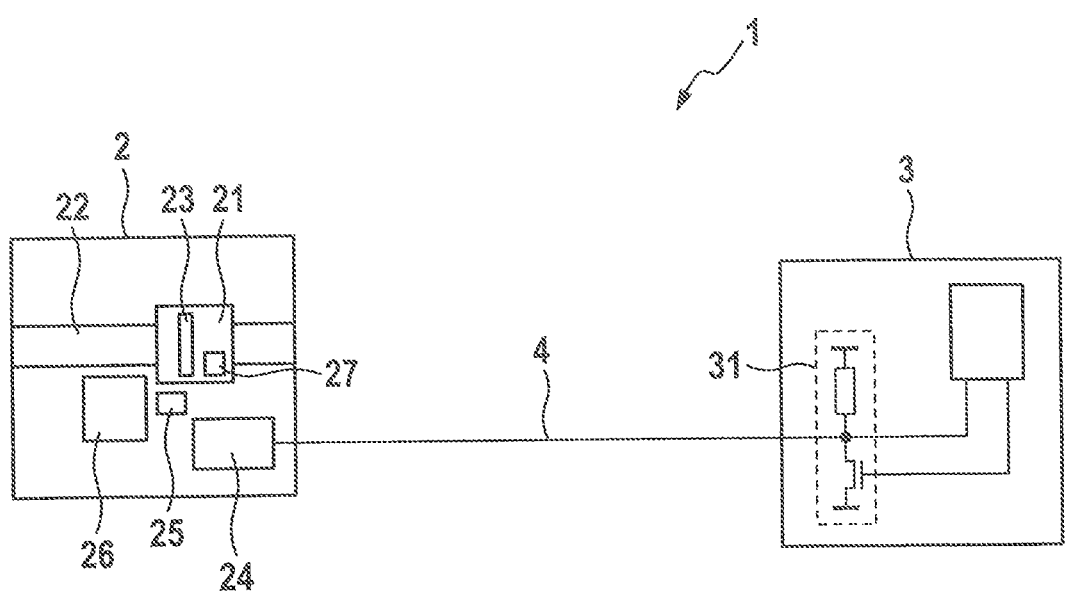
FIG. 1 shows a schematic representation of a sensor system including a hot-film air-mass sensor and a control unit connected to the air mass sensor.

FIG. 1 shows a schematic representation of a sensor system 1 including an air mass sensor 2 and a control unit 3, which are connected to one another via a signal line 4, in particular (apart from a separate voltage supply) a single-wire line.

Air mass sensor 2 includes a sensor area 21, which is situated in an air flow in an air guide 22, so that the air flow is directed over sensor area 21. Sensor area 21 is heatable with the aid of an electrical heating device 23, which, e.g., includes a resistance layer, and a sensor-area temperature, as the temperature of sensor area 21, is measurable with the aid of a temperature sensor 27.

A sensor logic 24 is provided, which carries out a continuous measurement of an air mass flow rate of the air flow. During the measurement operation, the heating device is controlled by specification of a heating current by sensor logic 24. The air flow, while flowing past, cools sensor area 21 warmed by heating device 23. Sensor logic 24 regulates the sensor-area temperature measured by temperature sensor 27 to a predefined setpoint temperature and adjusts the heating current according to the setpoint temperature. The adjusted heating current may be used as information about the level of the air mass flow rate (air mass flow rate information) through flow guide 22. Other methods for ascertaining information about the air mass flow rate are also conceivable. For example, a temperature difference effectuated by the air flow in the heated area may be ascertained and used as information about the level of the air mass flow rate through flow guide 22.

The air mass flow rate information is processed in a sensor logic 24 in a suitable way and is transmitted to control unit 3 via signal line 4. Possible types of transmission may be serial digital transmission, such as, for example, with the aid of a SENT protocol, a FAS transmission, in which the temperature information is transmitted in the form of a frequency signal, or a transmission of an analog electrical variable.

A further piece of information transmitted by sensor logic 24 to control unit 3 includes the internal temperature of air mass sensor 2. This is ascertained as temperature information with the aid of a further temperature measuring device 25 and may be, for example, a measure of the ambient temperature.

An electrically operated auxiliary heater 26, which is activatable via sensor logic 24, may be provided. Auxiliary heater 26 is situated close to sensor area 21 and, when activated, effectuates a swirling of the air located over sensor area 21, so that contamination, such as, for example, dust particles or oil vapors, are prevented from depositing onto sensor area 21. A degradation of the sensor behavior induced by contamination of sensor area 21 may be prevented as a result.

In addition to the air mass flow rate information, sensor logic 24 may also be designed to transmit the temperature information regarding the internal sensor temperature to control unit 3 via signal line 4, e.g., encoded in the form of serially consecutive signal levels.

Auxiliary heater 26 is activated only when the internal combustion engine is switched off, since a proper measurement of an air flow flowing through air mass sensor 2 cannot be carried out when auxiliary heater 26 is active. A shutoff of the internal combustion engine is signaled by control unit 3 to air mass sensor 2 in a switch-off state by signal line 4 being set to a specified electrical potential, in particular a ground potential, so that sensor logic 24 cannot send data via signal line 4.

Sensor logic 24 is designed in such a way that it detects that data cannot be transmitted via signal line 4 and thereby detects that auxiliary heater 26 should be activated. Since signal transmission from air mass sensor 2 to control unit 3 is not possible in the switch-off state, an immediate diagnosis of auxiliary heater 26 is not possible.

In order to provide the specified electrical potential on the signal line, control unit 3 includes an input stage 31, which includes an input circuit, which is capable of drawing signal line 4 to the specified electrical potential, in particular a ground potential. For example, such an input circuit may include a pull-up resistor, which is coupled to a pull-down transistor, which is activated by a control unit logic in order to apply the specified electrical potential to signal line 4.

Figure 2:
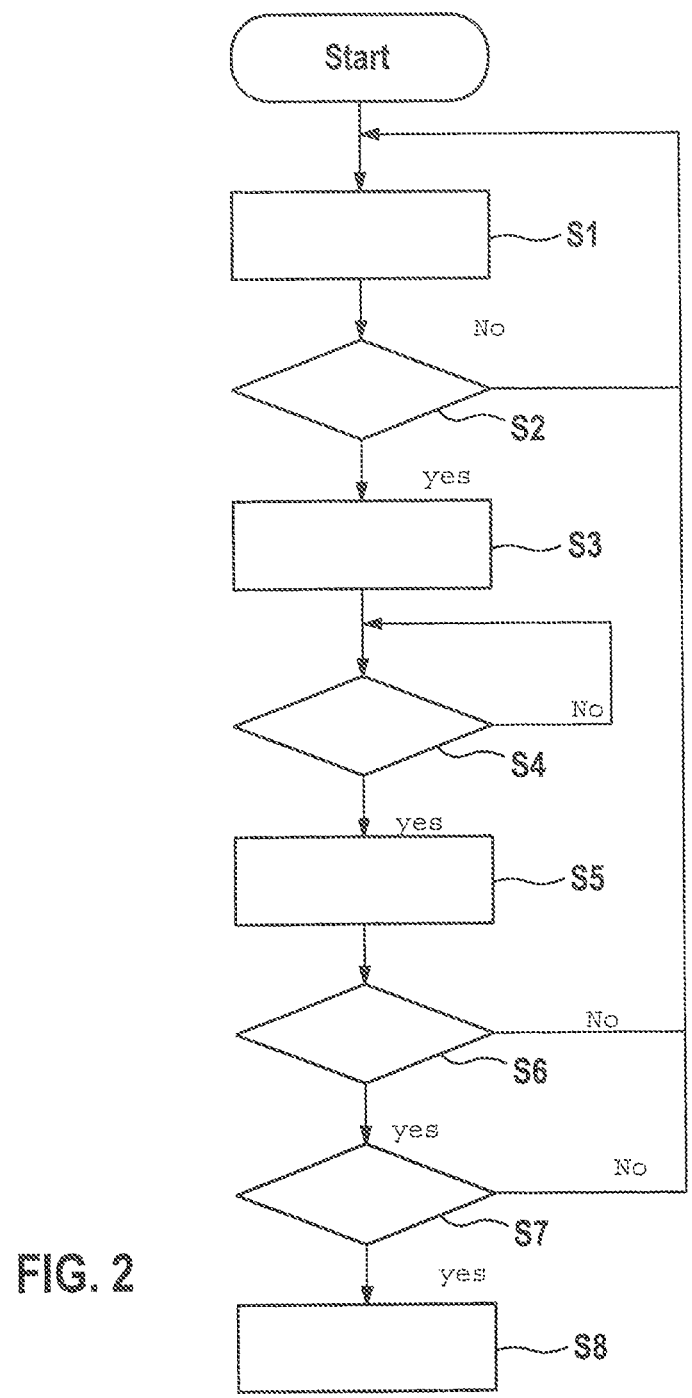
FIG. 2 shows a method for carrying out a diagnosis of the auxiliary heater of the air mass sensor.
Figure 3:
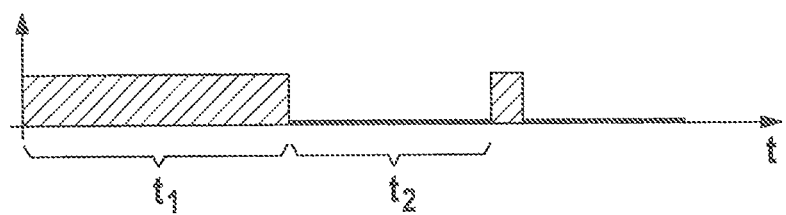
FIG. 3 shows the curve over time of the signal level on the signal line during the transition from a sensor operating mode to an auxiliary heater operating mode.

In addition, control unit logic 32 executes a method for carrying out the diagnosis of auxiliary heater 26 in air mass sensor 2. A flow chart for illustrating the method for carrying out the diagnosis of auxiliary heater 26 in air mass sensor 2 is shown in FIG. 2. The curve over time of the signal level on the signal line during the transition from a sensor operating mode to an auxiliary heater operating mode is shown in FIG. 3.

In step S1, air mass sensor 2 is in the sensor operating mode and gathers air mass information, temperature information and the like for transmission to control unit 3 via signal line 4. In the signal diagram in FIG. 3, the sensor operating mode is active for a time period $t_1$. In step S1, at least the temperature information is ascertained in air mass sensor 2 and is transmitted to control unit 3 via signal line 4.

In step S2, a check is carried out as to whether an auxiliary heater operating mode has been activated due to a shutoff of the internal combustion engine, which is signaled by control unit 3 via the particular signal level on signal line 4. If this is not the case, the method returns to step S1; otherwise (alternative: yes) the method continues with step S3.

In step S3, the most recently gathered piece of temperature information is stored in control unit 3. Auxiliary heater 26 is now activated in an auxiliary heater operating mode and, in step S4, waiting ensues for a certain predefined time period $t_2$. After expiration of the certain time period $t_2$, the auxiliary heater operating mode is deactivated again.

Sensor logic 24 may now transmit the most recently gathered piece of temperature information to control unit 3 again. The piece of temperature information which was gathered first after the deactivation of the auxiliary heater operating mode is stored in control unit 3 in step S5.

In step S6, a check is carried out as to whether boundary conditions for carrying out the diagnosis have been met. The boundary conditions may be that the engine temperature and/or the ambient temperature is/are within a predefined temperature range. In addition, as a boundary condition, a check may be carried out as to whether the heating time of auxiliary heater 26 was sufficiently long during the time period of the auxiliary heater operating mode to obtain a sufficient temperature difference provided auxiliary heater 26 is properly functioning. If boundary conditions for carrying out the diagnosis are not met (alternative: no), the method returns to step S1; otherwise (alternative: yes), the method continues with step S7.

In step S7, a check is carried out as to whether the difference, in particular the difference between the temperature information stored before the activation of the auxiliary heater operating mode and after the deactivation of the auxiliary heater operating mode is above a predefined temperature threshold value. If this is the case, auxiliary heater 26 is deemed to be functional and the method continues with step S1; otherwise (alternative: no), auxiliary heater 26 is deemed to be non-functional and this is signaled accordingly.

Since a failure of auxiliary heater 26 does not directly result in a failure of air mass sensor 2, the fault type of the failed auxiliary heater 26 may be stored in a fault memory in a suitable way in order to replace air mass sensor 2 during subsequent maintenance.

It may also be provided to debounce the diagnostic method and to not signal a corresponding fault of auxiliary heater 26 until after the predefined threshold value has been exceeded by a predetermined number of times, which is detected in step S7. In particular, the diagnosis of auxiliary heater 26 may be carried out during a start/stop operation of the engine system in motor vehicles.

In addition, the above-described diagnostic method may be carried out multiple times in succession during an overrun phase of the engine system and the results of the diagnosis may be evaluated accordingly.

What is claimed is:

1. A method for diagnosing a proper functioning of an auxiliary heater in an air mass sensor in an engine system including an internal combustion engine, the auxiliary heater being activated only when the internal combustion engine is switched off, the auxiliary heater being used for preventing contamination of a sensor area by effectuating a swirling of air located over the sensor area, the air mass sensor being configured to communicate air mass information via a signal line during a sensor operating mode and, if a specified state on the signal line is detected, to activate the auxiliary heater, the method comprising:

prior to activating the auxiliary heater, transmitting a first temperature information from the air mass sensor to the control unit via the signal line;

setting the state of the signal line to the specified state for a predefined time period to activate the auxiliary heater in an auxiliary heater operating mode for the predefined time period, the auxiliary heater being activated only when the internal combustion engine is switched off;

after expiration of the predefined time period: (i) deactivating the auxiliary heater operating mode, and (ii) transmitting a second temperature information from the air mass sensor to the controller via the signal line, the second temperature information being a temperature information most recently acquired by the air mass sensor;

and detecting whether proper functioning of the auxiliary heater is present depending on the difference between the first temperature information and the second temperature information.

2. The method as recited in claim 1, wherein the specified state corresponds to a specified potential on the signal line.

3. The method as recited in claim 2, wherein the specified potential on the signal line is detected when a signal applied by the air mass sensor onto the signal line does not change the specified potential.

4. The method as recited in claim 3, wherein proper functioning of the auxiliary heater is detected when the difference between the first temperature information and the second temperature information exceeds a predefined temperature threshold value.

5. The method as recited in claim 1, wherein a defect of the auxiliary heater is detected when the difference between the first temperature information and the second temperature information gathered after a shutoff of the engine system falls below the predefined temperature threshold value at least one time.

6. The method as recited in claim 1, wherein, after expiration of the predefined time period, the sensor operating mode is activated at least for a specified time, and wherein during the sensor operating mode, information is transmittable via the signal line in that no specified state is set on the signal line.

7. A control unit for diagnosing a proper functioning of an auxiliary heater for preventing contamination of a sensor area in an air mass sensor in an engine system including an internal combustion engine, the auxiliary heater preventing the contamination by effectuating a swirling of air located over the sensor area, the auxiliary heater being activated only when the internal combustion engine is switched off, the air mass sensor being configured to communicate air mass information via a signal line and, if a specified state on the signal line is detected, to activate the auxiliary heater, the control unit comprising:

an input stage configured to provide an input impedance and to set a specified state on the signal line; and a control unit logic configured to:
(i) control the input stage in such a way that the state of the signal line is set to the specified state for a predefined time period to activate the auxiliary heater in an auxiliary heater operating mode for the predefined time period, the auxiliary heater being activated only when the internal combustion engine is switched off;
(ii) receive a first temperature information from the air mass sensor via the signal line before the activation of the auxiliary heater operating mode, and after expiration of the predefined time period and the auxiliary heater is deactivated, receive a second temperature information from the air mass sensor via the signal line, the second temperature information being a temperature information most recently acquired by the air mass sensor; and
(iii) detect whether proper functioning of the auxiliary heater is present depending on the difference between the first temperature information and the second temperature information.

8. The control unit as recited in claim 7, wherein the control unit logic is configured to control the input stage after a signaling of a shutoff of the engine system, so that the potential of the signal line is set to the specified potential for the predefined time period in the auxiliary heater operating mode.

9. An engine system, comprising:
an internal combustion engine;
an air mass sensor;
an auxiliary heater for preventing contamination of a sensor area in the air mass sensor by effecting a swirling of air located over the sensor area, the auxiliary heater being activated only when the internal combustion engine is switched off; and
a control unit;
wherein the air mass sensor is configured to communicate air mass information via a signal line to the control unit and, if a specified state on the signal line is detected, to activate the auxiliary heater, and wherein the control unit includes:
an input stage configured to provide an input impedance and to set a specified state on the signal line; and
a control unit logic configured to:
(i) control the input stage in such a way that the state of the signal line is set to the specified state for a predefined time period to activate the auxiliary heater in an auxiliary heater operating mode for the predefined time period;
(ii) receive a first temperature information from the air mass sensor via the signal line before the activation of the auxiliary heater operating mode, and, after expiration of the predefined time period and the auxiliary heater is deactivated, receive a second temperature information from the air mass sensor via the signal line, the second temperature being a temperature information most recently acquired by the air mass sensor; and
(iii) detect whether proper functioning of the auxiliary heater is present depending on the difference between the first temperature information and the second temperature information.

10. A non-transitory, computer-readable data storage medium storing a computer program having program codes which, when executed on a computer, perform a method for diagnosing a proper functioning of an auxiliary heater in an air mass sensor in an engine system including an internal combustion engine, the auxiliary heater being activated only when the internal combustion engine is switched off, the auxiliary heater being used for preventing contamination of a sensor area by effectuating a swirling of air located over the sensor area, the air mass sensor being configured to communicate air mass information via a signal line during a sensor operating mode and, if a specified state on the signal line is detected, to activate the auxiliary heater, the method comprising:
prior to activating the auxiliary hater, transmitting a first temperature information from the air mass sensor to the control unit via the sensor line;
setting the state of the signal line to the specified state for a predefined time period to activate the auxiliary heater in an auxiliary heater operating mode for the predefined time period, the auxiliary heater being activated only when the internal combustion engine is switched off;
after expiration of the predefined time period: (i) deactivating the auxiliary heater operating mode, and (ii) transmitting a second temperature information from the air mass sensor to the controller via the signal line, the second temperature information being a temperature information most recently acquired by the air mass sensor;
and
detecting whether proper functioning of the auxiliary heater is present depending on the difference between the first temperature information and the second temperature information.

* * * * *